Patented Sept. 25, 1951

2,569,064

UNITED STATES PATENT OFFICE 2,569,064

GAMMA-LACTONES

Elbert C. Ladd and Merlin P. Harvey, Passaic, N. J., assignors to United States Rubber Company, New York, N. Y., a corporation of New Jersey No Drawing. Application April 19, 1949, Serial No. 88,488

9 Claims. (Cl. 260—344)

This invention relates to gamma-lactones of 2,2-dihalogeno-4-hydroxyalkanoic acids and to a novel method of preparing the same. More specifically the invention relates to the preparation of such lactones having the formula

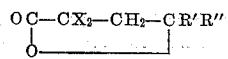

from 2,2,4-trihalogenoalkanoic esters of the general formula RO—CO—CX$_2$—CH$_2$—CXR′R″, wherein each X is one of the halogen atoms chlorine or bromine; R is a lower alkyl group (e. g., methyl, ethyl, propyl); and R′ and R″ may be one of the radicals hydrogen and lower alkyl (e. g., methyl, ethyl and propyl).

The 2,2,4-trihalogenoalkanoic esters which are the starting materials for use in our invention can themselves be readily prepared by heating at 25–120° C., a delta 1′-olefin, that is, a monoolefinic hydrocarbon, having a terminal methylene group and being of the type CH$_2$=CR′R″, wherein R′ and R″ are as previously defined, with from 1 to 20 molar equivalents of a trihalogeno-acetic acid ester RO—CO—CX$_3$, wherein R and X are as previously defined, in the presence of a source of free radicals, e. g., a peroxidic compound, such as benzoyl peroxide. This is illustrated by reaction (1) below:

(1)

RO—CO—CX$_3$ + $n$CH$_2$=CR′R″ $\xrightarrow{\text{free radicals}}$

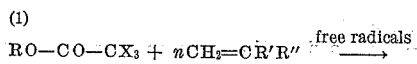

$n$ being a small integer, e. g., 1–5. Those products of the above formula in which $n=1$ are those employed in our invention.

The method of our invention consists in heating such a 2,2,4-trihalogenoalkanoic ester starting material at from 25° C. to 150° C. for from 1 to 24 hours and advantageously with a catalytic amount, e. g., 0.05 to 5.0% by weight based on the weight of the ester, of an acidic catalyst, such as sulfuric acid, p-toluenesulfonic acid and especially a polyvalent metal halide of the Friedel and Crafts type, whereby an alkyl halide RX is split off and the ester is converted to the gamma-lactone. These metal halides, which are acid-acting under the conditions of heating, include, for example, zinc chloride, boron trifluoride, antimony pentachloride, stannic chloride, and ferric chloride, the latter being preferred. The reaction is carried out in the presence or absence of an inert diluent. The reaction of our invention is illustrated in (4) below:

(4)

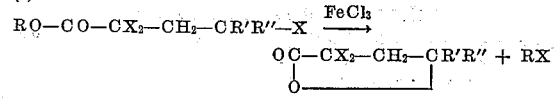

The products can be isolated and purified by extraction, fractional distillation and/or crystallization.

We have found that despite the well-known lability of the alpha-halogen atoms in alpha-halogenoalkanoic acids, esters, etc., the alpha-halogen atom of our starting material does not participate in the reaction of our invention, particularly where R′ and/or R″ are alkyl groups, so, the resulting alpha, alpha-dihalogeno-gamma-lactones can be modified by suitable reactions involving the alpha-halogen atom or atoms, such as hydrolysis, alkylation and dehydro-halogenation. Hence these lactones provide intermediates for the synthesis of a wide variety of organic compounds and they find particular use in the preparation of pharmaceuticals.

The following example discloses our invention in more detail. All parts are by weight.

Example

The starting material used in this example was prepared as follows:

A mixture of 1150 parts of ethyl trichloroacetate, 106 parts of isobutylene and 14.5 parts of benzoyl peroxide is heated with agitation in a pressure vessel at 70° C. for 48 hours. The reaction mixture is fractionally distilled to yield 206 parts of the new compound ethyl 2,2,4-trichloro-4-methylpentanoate, b. 81–3° C./2 mm.; $n_D^{20}$ 1.4688; chlorine content, 42.68% (theory, 42.97%).

A portion (123.69 parts) of the ethyl 2,2,4-trichloro-4-methylpentanoate, prepared above, is mixed with a catalytic quantity (ca. 0.1 part) of anhydrous ferric chloride and heated at 120° C. for 12 hours, during which ethyl chloride is formed as a by-product. The reaction mixture is then cooled to room temperature and it solidifies upon standing. The crude lactone of 2,2-dichloro-4-methyl-4-hydroxypentanoic acid, upon recrystallization from n-hexane, melts at 56.5–60° C. It can be further purified by steam distillation which yields 52.6 parts of this new lactone, m. 58–9° C.; chlorine content, 38.39% (theory, 38.74%).

In a similar manner the following reactions are carried out:

(a)

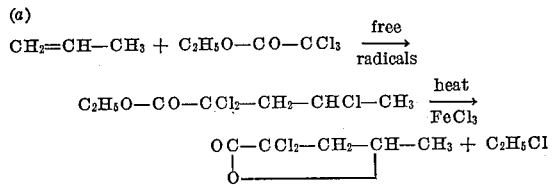

(b)

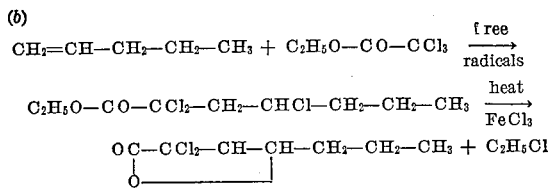

Any 2,2,4-trihalogenoalkanoic ester may be converted to the corresponding gamma-lactone by means of our invention. Examples are:

Ethyl 2,2,4-trichloro-4-methylpentanoate
Methyl 2,2,4-trichloro-4-methylpentanoate
Propyl 2,2,4-trichloro-4-methylpentanoate
Butyl 2,2,4-trichloro-4-methylpentanoate
Ethyl 2,2,4-tribromo-4-methylpentanoate
Methyl 2,2,4-tribromo-4-methylpentanoate
Propyl 2,2,4-trichloro-4-methylpentanoate
Butyl 2,2,4-tribromo-4-methylpentanoate
Ethyl 2,2,4-trichloropentanoate
Ethyl 2,2,4-trichlorobutanoate
Ethyl 2,2,4-trichloroheptanoate
Ethyl 2,2-dichloro-4-bromo-4-methylpentanoate

Having thus described our invention, what we claim and desire to protect by Letters Patent is:

1. As a new chemical, a lactone having the formula

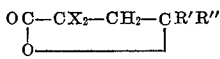

where X is one of the halogens chlorine and bromine, and R' and R'' are radicals of the class consisting of hydrogen and lower alkyl.

2. As a new chemical compound, a lactone having the formula $$OC-CCl_2-CH_2-C(CH_3)_2$$
$$|\underline{\qquad\qquad O\qquad\qquad}|$$

3. The method which comprises heating a 2,2,4-trihalogenoalkanoic ester of the formula $$RO-CO-CX_2-CH_2-CXR'R''$$

where X is one of the halogens chlorine and bromine, R is a lower alkyl group and R' and R'' are radicals of the class consisting of hydrogen and lower alkyl under anhydrous conditions, and thereby converting said ester to a lactone having the formula

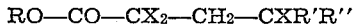

wherein X, R' and R'' all are as before.

4. The method which comprises heating a 2,2,4-trihalogenoalkanoic ester of the formula $$RO-CO-CX_2-CH_2-CXR'R''$$

where X is one of the halogens chlorine and bromine, R is a lower alkyl group and R' and R'' are radicals of the class consisting of hydrogen and lower alkyl in the presence of a catalytic amount of an anhydrous acidic catalyst selected from the group consisting of sulfuric acid, p-toluenesulfonic acid and polyvalent metal halides of the Friedel and Crafts type and at a temperature of from 25° C. to 150° C., and thereby converting said ester to a lactone having the formula

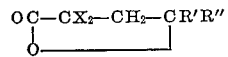

wherein X, R' and R'' all are as before.

5. The method which comprises heating a 2,2,4-trihalogenoalkanoic ester of the formula $$RO-CO-CX_2-CH_2-CXR'R''$$

where X is one of the halogens chlorine and bromine, R is a lower alkyl group and R' and R'' are radicals of the class consisting of hydrogen and lower alkyl in the presence of anhydrous ferric chloride in an amount ranging from 0.05 to 5.0% by weight based on said ester and at a temperature of from 25° C. to 150° C., and thereby converting said ester to a lactone having the formula

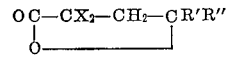

wherein X, R' and R'' all are as before.

6. The method of making the gamma-lactone of 2,2-dichloro-4-methyl-4-hydroxypentanoic acid which comprises heating ethyl 2,2,4-trichloro-4-methylpentanoate under anhydrous conditions at a temperature at which it decomposes and thereby forming the gamma lactone of 2,2-dichloro-4-methyl-4-hydroxypentanoic acid and ethyl chloride.

7. The method of making the gamma-lactone of 2,2-dichloro-4-methyl-4-hydroxypentanoic acid which comprises heating ethyl 2,2,4-trichloro-4-methylpentanoate in the presence of a catalytic amount of an anhydrous acidic catalyst selected from the group consisting of sulfuric acid, p-toluenesulfonic acid and polyvalent metal halides of the Friedel and Crafts type at a temperature of from 25° C. to 150° C., and thereby converting said ethyl 2,2,4-trichloro-4-methylpentanoate to the gamma lactone of 2,2-dichloro-4-methyl-4-hydroxypentanoic acid.

8. The method of making the gamma-lactone of 2,2-dichloro-4-methyl-4-hydroxypentanoic acid which comprises heating ethyl 2,2,4-trichloro-4-methylpentanoate at a temperature of from 25° C. to 150° C. in the presence of anhydrous ferric chloride in an amount ranging from 0.05 to 5.0% by weight based on said ethyl 2,2,4-trichloro-4-methylpentanoate.

9. The method of making the gamma-lactone of 2,2-dichloro-4-methyl-4-hydroxypentanoic acid which comprises heating ethyl 2,2,4-trichloro-4-methylpentanoate at a temperature of 120° C. in the presence of anhydrous ferric chloride in an amount ranging from 0.05 to 5.0% by weight based on said ethyl 2,2,4-trichloro-4-methylpentanoate and recovering the gamma-lactone of 2,2-dichloro-4-methyl-4-hydroxypentanoic acid from the resulting reaction mixture.

ELBERT C. LADD.
MERLIN P. HARVEY.

REFERENCES CITED

The following references are of record in the file of this patent:

UNITED STATES PATENTS

| Number | Name | Date |
|---|---|---|
| 2,390,526 | Elderfield | Dec. 11, 1945 |
| 2,485,100 | Ladd et al. | Oct. 18, 1949 |